(12) United States Patent
Chen et al.

(10) Patent No.: US 12,547,513 B2
(45) Date of Patent: Feb. 10, 2026

(54) METHOD AND APPARATUS FOR MONITORING HARDWARE PARTITION OF SERVER HOST SYSTEM

(71) Applicant: SUZHOU METABRAIN INTELLIGENT TECHNOLOGY CO., LTD., Jiangsu (CN)

(72) Inventors: Chaofan Chen, Jiangsu (CN); Baoyang Liu, Jiangsu (CN); Jiaming Huang, Jiangsu (CN)

(73) Assignee: SUZHOU METABRAIN INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 19/116,461

(22) PCT Filed: May 24, 2024

(86) PCT No.: PCT/CN2024/095307
§ 371 (c)(1),
(2) Date: Mar. 28, 2025

(87) PCT Pub. No.: WO2025/030986
PCT Pub. Date: Feb. 13, 2025

(65) Prior Publication Data
US 2025/0265164 A1    Aug. 21, 2025

(30) Foreign Application Priority Data

Aug. 9, 2023 (CN) .......................... 202310997627.8

(51) Int. Cl.
*G06F 11/00* (2006.01)
*G06F 11/30* (2006.01)
*G06F 13/42* (2006.01)

(52) U.S. Cl.
CPC ...... *G06F 11/3024* (2013.01); *G06F 11/3006* (2013.01); *G06F 13/4282* (2013.01)

(58) Field of Classification Search
CPC ............. G06F 11/2028; G06F 11/2033; G06F 11/3006; G06F 13/4282; G06F 13/3024
See application file for complete search history.

(56) References Cited

U.S. PATENT DOCUMENTS

| 2010/0017735 | A1 | 1/2010 | Erickson et al. |
| 2010/0125655 | A1* | 5/2010 | Elzur ...................... H04L 41/24 709/223 |

(Continued)

FOREIGN PATENT DOCUMENTS

| CN | 106678067 A | 5/2017 |
| CN | 112000501 A | 11/2020 |

(Continued)

OTHER PUBLICATIONS

Search Report dated Sep. 12, 2023 received in Chinese Application No. 202310997627.8, together with an English-language translation.

(Continued)

*Primary Examiner* — Charles Ehne
(74) *Attorney, Agent, or Firm* — Scully, Scott, Murphy & Presser, P.C.

(57) ABSTRACT

Embodiments of the present application provide a method and apparatus for monitoring a hardware partition of a server host system. The method includes: determining a target partition management system on a baseboard management controller, wherein the target partition management system is any partition management system among a plurality of partition management systems divided on the baseboard management controller; selecting, for the target partition management system, at least one target link unit among a plurality of link units divided on a complex programmable (Continued)

logic device, wherein the target link unit is configured to connect the target partition management system and a target hardware partition among a plurality of hardware partitions divided on the server host system; and monitoring the operation of the target hardware partition via the target partition management system and the target link unit. The present application improves the operation monitoring efficiency of a server. The present application relates to the field of computers.

19 Claims, 6 Drawing Sheets

(56) References Cited

U.S. PATENT DOCUMENTS

| | | | | |
|---|---|---|---|---|
| 2012/0011288 | A1* | 1/2012 | Kanaya | G06F 13/385 |
| | | | | 710/36 |
| 2014/0344431 | A1* | 11/2014 | Hsu | H04L 41/0213 |
| | | | | 709/223 |
| 2021/0141626 | A1* | 5/2021 | Ladkani | G06F 3/0676 |
| 2024/0211275 | A1* | 6/2024 | Cudak | G06F 21/572 |

FOREIGN PATENT DOCUMENTS

| | | |
|---|---|---|
| CN | 112069106 A | 12/2020 |
| CN | 113204375 A | 8/2021 |
| CN | 114462050 A | 5/2022 |
| CN | 116244229 A | 6/2023 |
| CN | 116521209 A | 8/2023 |
| CN | 116719700 A | 9/2023 |

OTHER PUBLICATIONS

International Search Report dated Aug. 23, 2024 received in International Application No. PCT/CN2024/095307, together with an English-language translation.

Chinese Office Action dated Sep. 14, 2023 received in Chinese Application No. 202310997627.8, together with an English-language translation.

* cited by examiner

METHOD AND APPARATUS FOR MONITORING HARDWARE PARTITION OF SERVER HOST SYSTEM

CROSS-REFERENCE TO RELATED APPLICATION

The present disclosure is a National Stage Filing of the PCT International Application No. PCT/CN2024/095307 filed on May 24, 2024, which claims priority to Chinese Patent Application No. 202310997627.8, filed in the China National Intellectual Property Administration (CNIPA) on Aug. 9, 2023, and entitled "Method and Apparatus for Monitoring Hardware Partition of Server Host System", which is incorporated herein by reference in its entirety.

TECHNICAL FIELD

Embodiments of the present application relate to the field of computers, and in particular to a method and apparatus for monitoring a hardware partition of a server host system.

BACKGROUND

In the field of the server industry, the technology of hardware partitions of computing resources, such as a (Central Processing Unit (CPU) for short) of a general-purpose host system, has been born at the right moment, one server is partitioned into two or even more physical host systems to independently bear business and provide services, which brings difficulties and challenges to the system design of a baseboard management controller (Baseboard Management Controller (BMC) for short) for hardware partitions. In order to ensure the long-term stable and efficient operation of the server, a server system must have a powerful fault monitoring and management function. Since a traditional server usually implements the acquisition of temperature of the CPU and the collection of information of a key register via a management engine (Management Engine (ME) for short) in a platform controller hub (Platform Controller Hub (PCH) for short), and then sends these pieces of data to the BMC for further processing. However, the ME itself undertakes a plurality of complex tasks of server management, and there are often cases in which the acquisition of the temperature of the CPU and the collection of the register are interrupted by other tasks; and meanwhile, when a system crash occurs in the server, the ME is also likely to be affected and unable to work. Therefore, the efficiency of acquiring operation data (e.g., the temperature of the CPU, register data, and the like) in the server in the prior art is relatively low, resulting in low operation monitoring efficiency of the server.

SUMMARY

Embodiments of the present application provide a method and apparatus for monitoring a hardware partition of a server host system, so as to at least resolve the problem of low operation monitoring efficiency of a server in the related art.

According to an embodiment of the present application, a method for monitoring a hardware partition of a server host system of a server monitoring component is provided, including: determining a target partition management system on a baseboard management controller, wherein the target partition management system is any partition management system among a plurality of partition management systems divided on the baseboard management controller; selecting, for the target partition management system, at least one target link unit among a plurality of link units divided on a complex programmable logic device, wherein the target link unit is configured to connect the target partition management system and a target hardware partition among a plurality of hardware partitions divided on the server host system; and monitoring the operation of the target hardware partition via the target partition management system and the target link unit.

According to an embodiment of the present application, a baseboard management controller is further provided, including: a plurality of partition management systems, wherein a target partition management system among the plurality of partition management systems is connected with at least one target link unit on a complex programmable logic device, the target partition management system is any partition management system among the plurality of partition management systems, and the target link unit is any link management unit among a plurality of link units divided on the complex programmable logic device; and the target link unit is connected with a target hardware partition among a plurality of hardware partitions divided on a server host system, the target hardware partition is any hardware partition among the plurality of hardware partitions, and the target partition management system is configured to monitor the operation of the target hardware partition via the target link unit.

In an exemplary embodiment, the target partition management system includes a target operating system and a target hardware interface, wherein the target hardware interface is configured to connect the target partition management system and the target link unit, and is configured to read operation data of the target hardware partition from the target link unit; and the target operating system is configured to monitor the operation of the target hardware partition by using the operation data.

In an exemplary embodiment, the target partition management system includes an interrupt interface, wherein the interrupt interface is configured to transmit an interrupt signal sent by the target link unit to the target partition management system, and the interrupt signal is used for indicating that the operation data of the target hardware partition has been sent to the target link unit.

According to an embodiment of the present application, a complex programmable logic device is further provided, including: a plurality of link units, wherein at least one target link unit among the plurality of link units is connected with a target hardware partition among a plurality of hardware partitions divided on a server host system, the target link unit is any link unit among the plurality of link units, and the target hardware partition is any hardware partition among the plurality of hardware partitions; and the target link unit is further connected with a target partition management system among a plurality of partition management systems divided on a baseboard management controller, the target partition management system is any partition management system among the plurality of partition management systems, and the target partition management system is configured to monitor the operation of the target hardware partition via the target link unit.

In an exemplary embodiment, the target link unit is connected with the target partition management system via a target hardware interface in the target partition management system, and transmits operation data of the target hardware partition to the target partition management system via the target hardware interface.

In an exemplary embodiment, the target link unit further includes a target controller, wherein the target controller is configured to convert data transmitted between the target hardware partition and the target partition management system, the target controller is a controller supporting a platform environment control interface (Platform Environment Control Interface (PECI) for short) transport protocol, and the target controller is connected with the target hardware partition via a target control interface.

In an exemplary embodiment, a server host system is further provided, including: a plurality of hardware partitions, wherein a target hardware partition among the plurality of hardware partitions is connected with a target link unit, and the target link unit is any link unit among a plurality of link units divided on a complex programmable logic device; and the target link unit is connected with a target partition management system, the target partition management system is any partition management system among a plurality of partition management systems divided on a baseboard management controller, and the target partition management system is configured to monitor the operation of the target hardware partition via the target link unit.

In an exemplary embodiment, a server is further provided, including: the above baseboard management controller, the above complex programmable logic device, and the above server host system.

In an exemplary embodiment, a computer program is stored in a computer non-volatile readable storage medium, when executed by a processor, implements operations comprising:

determining the target partition management system on the baseboard management controller, wherein the target partition management system is any partition management system among a plurality of partition management systems divided on the baseboard management controller;

selecting, for the target partition management system, the target link unit among a plurality of link units divided on the complex programmable logic device, wherein the target link unit is configured to connect the target partition management system and a target hardware partition among a plurality of hardware partitions divided on the server host system; and monitoring the operation of the target hardware partition via the target partition management system and the target link unit.

By means of the present application, since the plurality of partition management systems are divided on the baseboard management controller, each target partition management system corresponds to one target link unit divided in the complex programmable logic device, and the target link unit is connected with the target hardware partition among the plurality of hardware partitions divided in a server, the target partition management system may independently manage the target hardware partition via the target link unit. Thus, an interconnection topology of a PECI link is formed, the purpose of constructing an independent PECI link between the partition management system and the server is achieved, and the efficiency of acquiring the operation data of the server by the BMC is improved. Therefore, the operation monitoring efficiency of the server is improved.

BRIEF DESCRIPTION OF THE DRAWINGS

To illustrate technical solutions in the embodiments of the present application or in the prior art more clearly, a brief introduction on the drawings which are needed in the description of the embodiments or the prior art is given below. Apparently, the drawings in the description below are merely some embodiments of the present application, based on which other drawings may be obtained by those ordinary skilled in the art without any creative effort.

DETAILED DESCRIPTION OF THE EMBODIMENTS

Hereinafter, embodiments of the present application will be described in detail with reference to the drawings and in combination with the embodiments.

It should be noted that the terms "first" and "second" and the like in the specification, claims and the above drawings of the present application are used for distinguishing similar objects, and are not necessarily used for describing exemplary sequence or precedence order.

Figure 1:
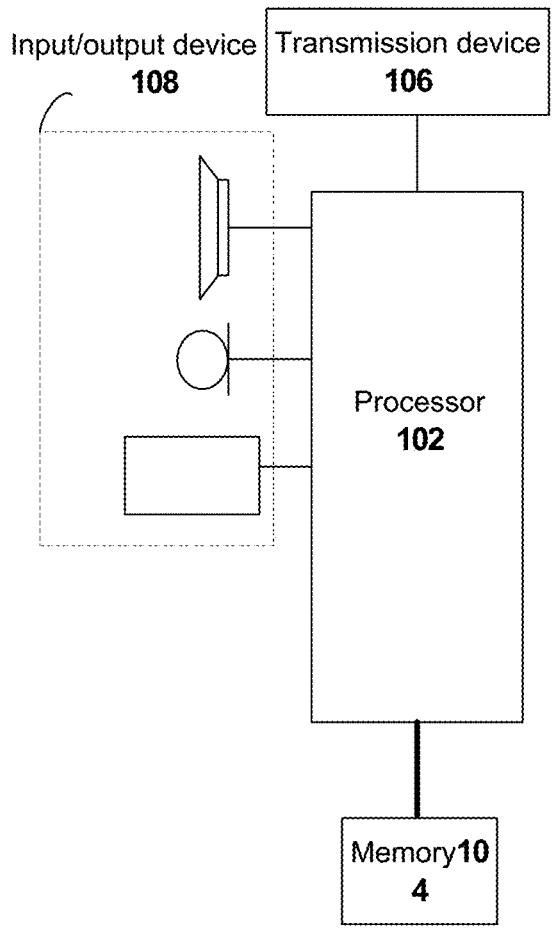
FIG. 1 is a block diagram of a hardware structure of a mobile terminal of a method for monitoring a hardware partition of a server host system according to an embodiment of the present application.

Method embodiments provided in the embodiments of the present application may be executed in a mobile terminal, a computer terminal, or a similar computing apparatus. Taking operation on the mobile terminal as an example, FIG. 1 is a block diagram of a hardware structure of a mobile terminal of a method for monitoring a hardware partition of a server host system according to an embodiment of the present application. As shown in FIG. 1, the mobile terminal may include one or more (only one is shown in FIG. 1) processors 102 (the processor 102 may include, but is not limited to, a processing apparatus such as a microcontroller unit (Microcontroller Unit (MCU)) or a field-programmable gate array (Field Programmable Gate Array (FPGA)), or the like), and a memory 104, configured to store data, wherein the mobile terminal may further include a transmission device 106, configured to implement a communication function, and an input/output device 108. Those ordinary skilled in the art may understand that the structure shown in FIG. 1 is merely schematic and does not cause a limitation to the structure of the mobile terminal. For example, the mobile terminal may further include more or fewer components than those shown in FIG. 1, or have a configuration different from that shown in FIG. 1.

The memory 104 may be configured to store computer programs, for example, software programs and modules of application software, for example, a computer program corresponding to the method for monitoring the hardware partition of the server host system in the embodiment of the present application, and the processor 102 executes various functional applications and data processing, that is, implements the above method, by running the computer programs stored in the memory 104. The memory 104 may include a high-speed random access memory, and may further include a non-volatile memory, such as one or more magnetic storage apparatuses, a flash memory, or other non-volatile solid-state memories. In some instances, the memory 104 may further include memories that are disposed remotely relative to the processor 102, and these remote memories may be connected to the mobile terminal via a network. Instances of the above network include, but are not limited to, the Internet, an intranet, a local area network, a mobile communication network, and combinations thereof.

The transmission device 106 is configured to receive or send data via a network. Optional instances of the above network may include a wireless network provided by a communication provider of the mobile terminal. In one instance, the transmission device 106 includes a network interface controller (Network Interface Controller (NIC) for short), which may be connected with other network devices via a base station to communicate with the Internet. In one instance, the transmission device 106 may be a radio frequency (Radio Frequency (RF) for short) module, which is configured to communicate with the Internet in a wireless manner.

Figure 2:
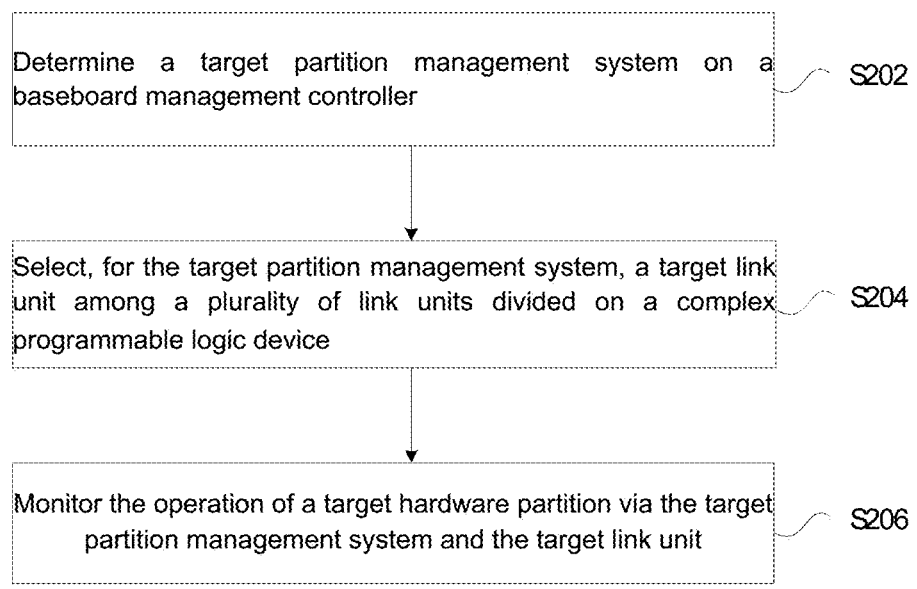
FIG. 2 is a flowchart of a method for monitoring a hardware partition of a server host system according to an embodiment of the present application.

In the present embodiment, a method for monitoring a hardware partition of a server host system is provided, FIG. 2 is a flowchart of the method for monitoring a hardware partition of a server host system according to an embodiment of the present application, and as shown in FIG. 2, the flow includes the following operations:

operation S202, determining a target partition management system on a baseboard management controller, wherein the target partition management system is any partition management system among a plurality of partition management systems divided on the baseboard management controller;

operation S204, selecting, for the target partition management system, at least one target link unit among a plurality of link units divided on a complex programmable logic device, wherein the target link unit is configured to connect the target partition management system and a target hardware partition among a plurality of hardware partitions divided on the server host system; and operation S206, monitoring the operation of the target hardware partition via the target partition management system and the target link unit.

An executive body of the above operations may be a processor, or a processor or a processing device, which is disposed relatively independent from a terminal or a server, and the like, but is not limited thereto.

The present embodiment may be applied to a scenario in which partition management needs to be performed on a host, for example, one server is partitioned into a plurality of hardware partition systems, each hardware partition system independently bears business and provide services, and thus each physical host system needs to be independently monitored.

By means of the above operations, since the plurality of partition management systems are divided on the baseboard management controller, each target partition management system corresponds to one target link unit divided in the complex programmable logic device, and the target link unit is connected with the target hardware partition among the plurality of hardware partitions divided in the server, the target partition management system may independently manage the target hardware partition via the target link unit. Thus, an interconnection topology of a PECI link is formed, the purpose of constructing an independent PECI link between the partition management system and the server is achieved, and the efficiency of acquiring operation data of the server by the BMC is improved. Therefore, the problem of low operation monitoring efficiency of the server in the related art may be solved, and the effect of improving the operation monitoring efficiency of the server may be achieved.

Optionally, in the present embodiment, the baseboard management controller may be, but is not limited to, a dedicated controller, which provides intelligent management for a mainboard and is configured to monitor and manage the server based on an Intelligent Platform Management Interface (IPMI) technical design specification, for example, a BMC. The BMC may have an independent operator, a controller, a memory and an input/output device, and may also have an independent software system, which includes a basic boot system, an operating system, and various application programs running on a BMC system. On the mainboard, the BMC may be an independently inserted module and may also be designed as a component integrated on the mainboard, and the BMC is often designed on the mainboard of the server or a computer.

Optionally, in the present embodiment, the complex programmable logic device includes, but is not limited to, a device having a link function, and has a data conversion function, for example, a Complex Programmable Logic Device (CPLD). The CPLD may have an independent operator, a controller, a memory and an input/output device, and may also have an independent software system, which includes a basic boot system, an operating system, and various application programs running on the BMC system. On the mainboard, the CPLD may be an independently inserted module and may also be designed as a component integrated on the mainboard, and the CPLD is often designed on the mainboard of the server or the computer. A CPLD logic unit and an FPGA logic unit are inherent devices in a server system, therefore hardware resources in the server system may be fully utilized without additionally adding a hardware structure. It should be noted that a hardware device may also be added according to actual needs to meet the conversion function of the PECI link.

Optionally, in the present embodiment, the server host system may be, but is not limited to, an operating system, which is provided with a plurality of CPUs and is installed on a computer host, and the operating system is generally Windows, Mac, OS and other systems, which manage hardware and software resources of the computer, and provide services and interfaces for use by users or application programs.

Optionally, in the present embodiment, hardware resources of the server host system may be partitioned by, but not limited to, taking a CPU as a partition unit, to obtain a plurality of hardware partitions. Each hardware partition among the plurality of hardware partitions respectively corresponds to one independent operating system, that is, each hardware partition includes hardware resources, such as computing, storage, network and Input/Output (I/O), required for system operation of itself.

Optionally, in the present embodiment, at a software level, each hardware partition may respectively operate different operating systems or different versions of the same operating system, and is configured to manage respective independent operation of the corresponding operating system of each hardware partition.

In an exemplary embodiment, selecting, for the target partition management system, the target link unit among the plurality of link units divided on the complex programmable logic device includes: acquiring the plurality of link units on the complex programmable logic device; allocating a target operating system on the baseboard management controller to each target link unit among the plurality of link units, wherein the target link unit at least meets a link requirement of the target operating system; allocating a hardware interface on the baseboard management controller to the target link unit to obtain a target hardware interface, wherein the target hardware interface at least meets a hardware connection requirement of the target operating system; and establishing a correspondence between the target partition management system and the target link unit having a correspondence with the target operating system and the target hardware interface, to obtain a link unit and a partition management system, which have a correspondence. In the present embodiment, the target operating system may be, but is not limited to, any operating system running on the baseboard management controller, and may be any operating system among a plurality of operating systems deployed on a processor of an embedded system, that is, an embedded operating system, the embedded operating systems may be divided into a real-time operating system (Real Time Operate System (RTOS)) and a non-real-time operating system according to the sensitivity to a response time, the real-time operating system may include, but is not limited to, a FreeRTOS and RT Linux (AReal-Time Linux, also referred to as real-time Linux, is a real-time operating system in Linux), and the like, and the Linux, also known as GNU/Linux, is a free to use and freely propagated Unix-like operating system and is is a POSIX based multi-user and multi-task operating system supporting multi-thread and multi-CPU. The non-real-time operating system may include, but is not limited to, Contiki (a small, open-source and highly portable multi-task computer operating system), an HeliOS (an extensible mobile back-end frame developed by using Ruby), Linux, and the like. The Linux system runs independently in the partition management system. Therefore, the purpose of independently monitoring each server is achieved.

Optionally, in the present embodiment, the plurality of operating systems may be, but are not limited to, a plurality of heterogeneous or isomorphic operating systems configured to manage the BMC, that is, the type of each operating system may be the same or different.

Optionally, in the present embodiment, the embedded system is an apparatus configured to control, monitor or assist in operating machines and devices, and is a dedicated computer system. The embedded system is a dedicated computer system, which is centered on applications, based on the computer technology, have clippable software and hardware, and is applicable to strict requirements of application systems for functions, reliability, costs, volumes, power consumption, etc. When defined from the perspective of application objects, the embedded system is a combination of software and hardware, and may also include mechanical and other auxiliary apparatuses.

Optionally, in the present embodiment, from the perspective of hardware, the embedded system may include, but is not limited to, hardware devices such as a processor, a memory and a peripheral circuit, and the target operating system may run, but is not limited to, based on the processor of the embedded system. From the perspective of software, the embedded system may include, but is not limited to, an underlaying drive, an operating system, an application program, and the like, and the target operating system is an operating system in the embedded system.

In an exemplary embodiment, before establishing the correspondence between the target partition management system and the target link unit having the correspondence with the target operating system and the target hardware interface, the method further includes: acquiring the plurality of partition management systems on the baseboard management controller; allocating an operating system on the baseboard management controller to each target partition management system among the plurality of partition management systems, to obtain the target operating system; allocating a hardware interface on the baseboard management controller to each target partition management system, to obtain the target hardware interface; and establishing a correspondence of the target partition management system with the target operating system and the target hardware interface, to obtain a partition management system, an operating system link and a hardware interface, which have a correspondence. In the present embodiment, one partition management system corresponds to one operating system, and the operating system is configured to process data to be received or sent in the partition management system. One or more target hardware interfaces are provided in the partition management system. The target hardware interface is an interface having a data transmission capability, which is correspondingly connected to a link management unit, and includes, but is not limited to, an I2C interface. For example, the target partition management system and the target link unit in the BMC are connected by I2C.

In an exemplary embodiment, after establishing the correspondence between the target partition management system and the target link unit having the correspondence with the target operating system and the target hardware interface, the method further includes: acquiring the plurality of hardware partitions of the host system; allocating a controller on the complex programmable logic device to each target hardware partition among the plurality of hardware partitions, to obtain a target controller, wherein the target controller at least meets a control operation requirement for the target hardware partition; allocating a control interface on the complex programmable logic device to the target hardware partition, to obtain a target control interface, wherein the target control interface at least meets a connection requirement of the target hardware partition; and establishing a correspondence of the target hardware partition with the target controller and the target control interface, to obtain a hardware partition and a link unit, which have a correspondence. In the present embodiment, the target controller includes, but is not limited to, a processor, or another device having a control capability, for example, a PECI controller. A controller may also be provided in the hardware partition, and is connected with the target controller via the target control interface. For example, the PECI controller in the target link unit is connected with the PECI controller in the target hardware partition by a PECI interface for data transmission.

In an exemplary embodiment, monitoring the operation of the target hardware partition via the target partition management system and the target link unit includes: sending request data to the target link unit via the target partition management system, wherein the request data is configured to request operation data of the target hardware partition; converting, via the target link unit, the request data into data supporting a PECI transport protocol, to obtain target request data, and sending the target request data to the target hardware partition; when the target hardware partition responds to the target request data, acquiring response data that is generated by the target hardware partition and includes the operation data; receiving, via the target link unit, the response data sent by the target hardware partition, and converting the response data into data supporting an I2C transport protocol, to obtain target response data, wherein the response data is data supporting the PECI transport protocol; and acquiring the target response data from the target link unit via the target partition management system, extracting, from the target response data, the operation data generated by the target hardware partition, and monitoring the operation of the target hardware partition by using the operation data. In the present embodiment, the request data includes at least one of the following: an address of the target hardware partition, detection information of the target hardware partition, a data format of the request data, and information of parameters for requesting to acquire the operation data of the target hardware partition, wherein the detection information is configured to request to detect whether a link supporting the transmission of PECI data is provided in the target hardware partition. The conversion of the request data is mainly to accelerate the transmission of the request data, for example, the request data is converted into the PECI data, and thus the PECI data may be quickly transmitted to the target hardware partition via the target link unit. The response data includes the operation data (e.g., information such as temperature and an operating speed) of the target hardware partition. The conversion of the response data is also to accelerate the transmission of the response data. The operation data of the server includes the temperature of the CPU in the server, the power consumption of the CPU, the information of a key register, and fault state information of an UPI link, a memory controller, a PCIe link, etc. In the present embodiment, data is transmitted between the partition management system and the link unit via an I2C interface without the need to provide a PECI controller in the partition management system, and PECI transmission between the partition management system and the hardware partition may be implemented via the conversion of the link unit. Therefore, the design costs of the BMC and the host system may be saved on, and the computing performance may be improved.

Figure 4:
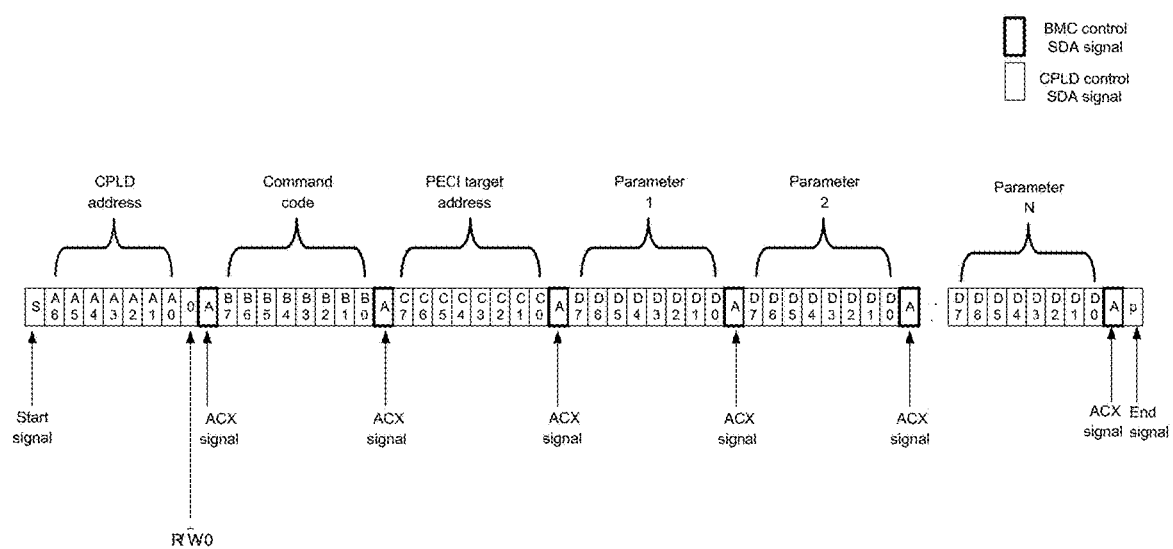
FIG. 4 is a schematic diagram of a data format of request data according to an embodiment of the present application.
Figure 5:
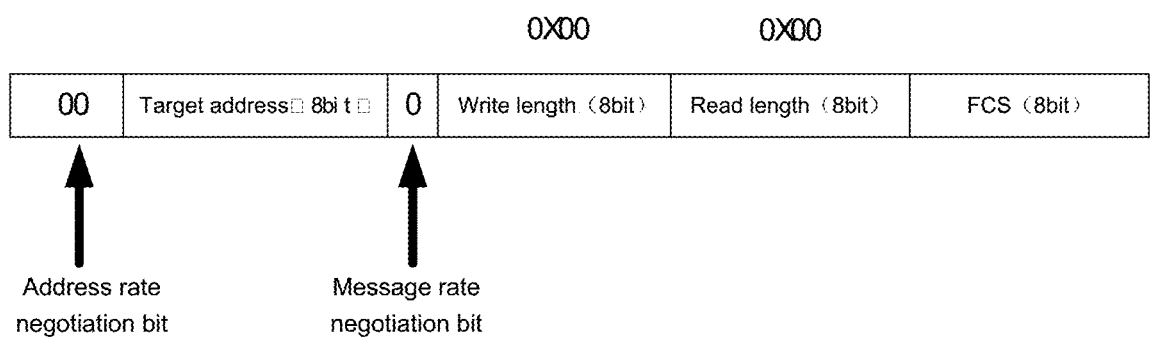
FIG. 5 is a schematic diagram of a format of PECI data according to an embodiment of the present application.

For example, the format of the request data is shown in FIG. 4, the request data includes an address of the server (a PECI target address in FIG. 4), server detection information, data format information (a command code in FIG. 4), and information of parameters (parameter 1 to parameter N shown in FIG. 4) for requesting the operation data of the server, wherein the server detection information is used for requesting to detect whether a PECI link is provided in the server, the data format information includes a data transmission format supported by the request data, and the parameter information includes parameters for requesting the operation data of the server. The request data has a Ping command for detecting the state of the PECI link, as well as commands for acquiring the temperature and the register. When the link unit is a partition in the CPLD, the request data further includes a CPLD address, the request data is sent to a corresponding link unit according to the complex programmable logic device (CPLD for short) address, and the request data is converted into data of a PECI format via a conversion module in the CPLD, to obtain target request data, wherein the target request data is the data of the PECI format. A PECI data format includes fields such as a target address (i.e., an address of a PECI controller on a Host side of the host system, and the address ranges from 0×30 to 0×37), a write length, a read length, a command code, etc. For example, when the PECI data format is a Ping command, the fields included in the PECI data format are shown in FIG. 5. An address rate negotiation bit and a message rate negotiation bit are of fixed formats and are respectively two bits 0 and one bit 0, and both the write length and the read length are 0×00. Since the Ping command is uniquely identified by the write length and the read length both of which the lengths are 0×00, no command code field is required. A frame check sequence (Frame Check Sequence (FCS) for short) field is response data of the hardware partition on the Host side and uses a CRC check form.

Optionally, sending the request data to the target link unit via the target partition management system includes: generating the request data via the target operating system corresponding to the target partition management system; and sending the request data to the target link unit via the target hardware interface corresponding to the target partition management system, wherein the target hardware interface allows the transmission of the request data supporting the I2C transport protocol.

Optionally, converting, via the target link unit, the request data into the data supporting the PECI transport protocol, to obtain the target request data, and sending the target request data to the target hardware partition includes: converting the request data into the target request data via the target controller corresponding to the target link unit, wherein the target controller is a controller supporting the PECI transport protocol, the target controller is connected with a register in the target link unit, and the register is configured to store the target request data; and sending the target request data from the register to the target hardware partition via the target control interface corresponding to the target link unit. The PECI, namely, Platform Environment Control Interface, is a one-wire bus configured to monitor the temperature of the CPU and a device group, and is mainly applied to monitoring the temperature of the CPU.

Optionally, receiving, via the target link unit, the response data sent by the target hardware, and converting the response data into the data supporting the I2C transport protocol, to obtain the target response data includes: converting the response data into the target response data via the target controller corresponding to the target link unit, wherein the target controller is the controller supporting the PECI transport protocol, the target controller is connected with the register in the target link unit, and the register is configured to store the target response data. In the present embodiment, the target controller is mainly configured to perform format conversion on the request data. The request data acquired from the partition management system is data of an I2C format, and the request data needs to be converted into the target request data of the PECI format. The data of the PECI format includes a plurality of formats, for example, a message format of the ping command, including a target address field, a write length field, a read length field, and the like. It should be noted that the conversion of the data is merely conversion of the data format and mainly for the transmission between different devices, and the content of exemplary request is unchanged. In addition, in the present embodiment, different types of request data correspond to different registers, the register mainly performs PECI protocol logic control on the data according to the PECI transport protocol, and converts the data into a waveform signal for transmission, and the register may be a read-write register.

Optionally, the target controller is an entity implemented by a PECI protocol, and a PECI interface in the target controller is connected to a PECI pin of the CPU in the hardware partition; and the hardware partition is connected with a first PECI interface via a second PECI interface in a second PECI controller included in the hardware partition, so as to implement the transmission of the PECI request data and the response data of the hardware partition and the link unit.

Optionally, before acquiring the target response data from the target link unit via the target partition management system, the method further includes: sending an interrupt signal to the target partition management system via the target link unit, wherein the interrupt signal is used for indicating that the response data has been sent to the target link unit. In the present embodiment, the partition management system is a master device in a server monitoring component, and the link unit is a slave device in the server monitoring component. The interaction between the partition management system and the link unit needs to be actively initiated by the partition management system, and the link unit makes a response. After receiving a response message, the link unit does not actively send the response message to the partition management system, but notifies the partition management system via the interrupt signal that the response message has been received, to prompt the partition management system to actively initiate an acquisition instruction for acquiring the response data, so as to read the response data from the register in the link unit. In the present embodiment, the link unit sends the interrupt signal to the partition management system, so that the partition management system may acquire the response data at the first time, thereby improving the monitoring efficiency of the server.

Optionally, the processing process of the response message is similar to the processing process of the request data, in which format conversion and transmission to the register are both required. Therefore, the purpose of quickly acquiring the operation data of the server is achieved.

Optionally, acquiring the target response data from the target link unit via the target partition management system, extracting, from the target response data, the operation data generated by the target hardware partition, and monitoring the operation of the target hardware partition by using the operation data includes: generating a read instruction via the target operating system corresponding to the target partition management system, and sending the read instruction to the target link unit via the target hardware interface corresponding to the target partition management system, wherein the target hardware interface allows the transmission of the request data supporting the I2C transport protocol; reading, via the target hardware interface, the target response data from the register corresponding to the target link unit; and parsing the target response data via the target operating system to acquire the operation data, and monitoring the operation of the target hardware partition according to the operation data. In the present embodiment, physical addresses of the hardware interfaces on the BMC use a unified addressing manner, that is, resources such as LPC0, LPC1, I2C0-I2C5, LAN0, LAN1 and PCIE have mutually exclusive address spaces in the BMC system, in this way, it may be ensured that other management partitions are not affected when each management partition performs hardware resource access just by ensuring that hardware resources defined in different management partitions on the BMC are different.

Figure 3:
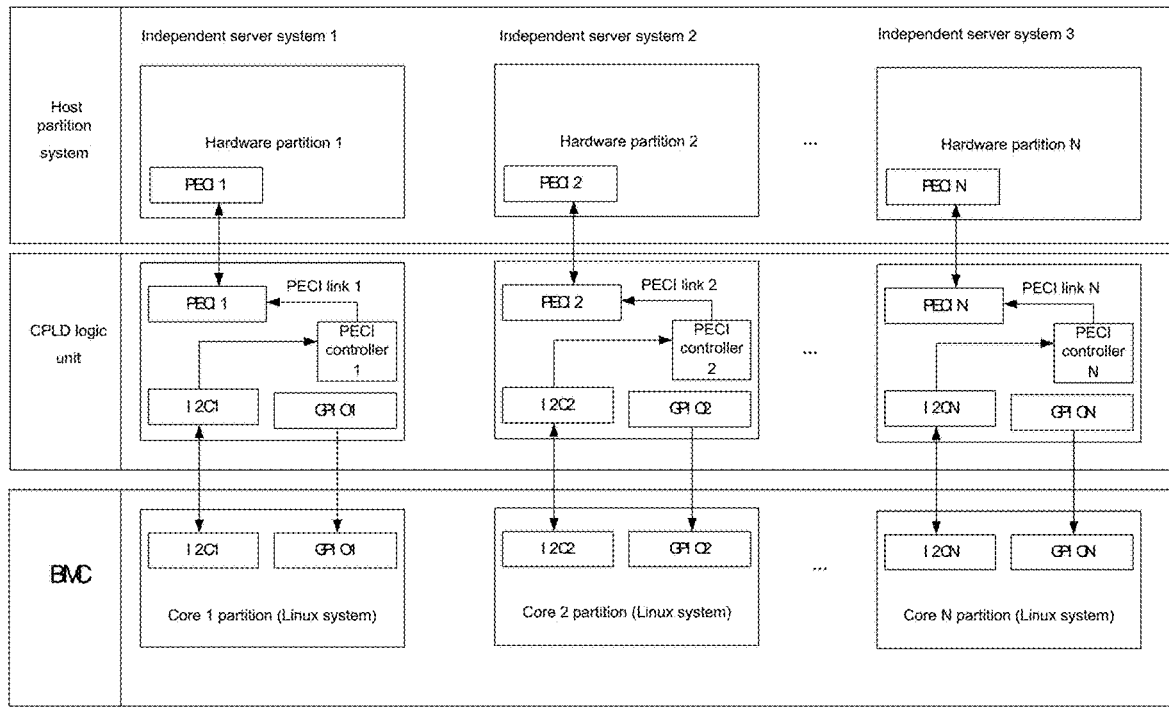
FIG. 3 is a schematic structural diagram of exemplary embodiment of a server monitoring system according to an embodiment of the present application.

In exemplary implementation, it is taken as an example that the baseboard management controller is a BMC, the BMC is divided into three partition management systems, and the operating system in each partition management system is a Linux system. As shown in FIG. 3, each hardware partition is equivalent to an independent server system in a Host partition system, the Host partition system is divided into N hardware partitions according to the number of CPU units, and each hardware partition corresponds to a CPU in one server, which is equivalent to that the entire host system is split into N independent server systems. In order to implement the independent monitoring and management of each independent server system, a BMC multi-core processor is divided into N partition management systems in the unit of a core, which correspond to Core 1, Core 2, . . . , Core N. One Core is equivalent to one partition management system. Correspondingly, the CPLD logic unit is divided into N partitions, and one partition is equivalent to one link unit.

Optionally, one independent server system in the Host partition system includes one PECI controller interface, as shown in FIG. 3, a hardware partition 1 is provided with a control interface PECI1. Each Core partition in the BMC is correspondingly provided with one I2C hardware connection interface and one GPIO interface are correspondingly disposed in each Core partition in the BMC. The N partitions in the CPLD logic unit include N parallel link units, and each link unit corresponds to exemplary conversion function of the PECI link of one hardware partition on the Host side.

Optionally, as shown in FIG. 3, an I2C interface in the Core 1 is connected with an I2C interface in a link unit in the CPLD logic unit, and an I2C link between the link unit and the partition management system is responsible for performing data transmission of data during PECI request and response between the BMC and the CPLD, the request includes request data, and the response includes response data. The GPIO interface of the partition management system is configured to receive an interrupt signal sent from the link unit, wherein the interrupt signal is used for indicating that the link unit has been ready to send PECI response data to the partition management system. In addition to the I2C interface and the GPIO interface, the link unit further includes one PECI controller module and a PECI external interface corresponding thereto, wherein the PECI controller module is an entity implemented by the PECI protocol, and the PECI interface is configured to be connected with the PECI interface of the hardware partition on the Host side. The PECI interface is connected to the PECI pin of the CPU of the hardware partition. The Host side is connected with the PECI interface of the CPLD logic unit via the PECI interface of the hardware partition system, so as to implement the transmission of PECI request and response data of a Host hardware partition unit and the CPLD logic unit.

Figure 6:
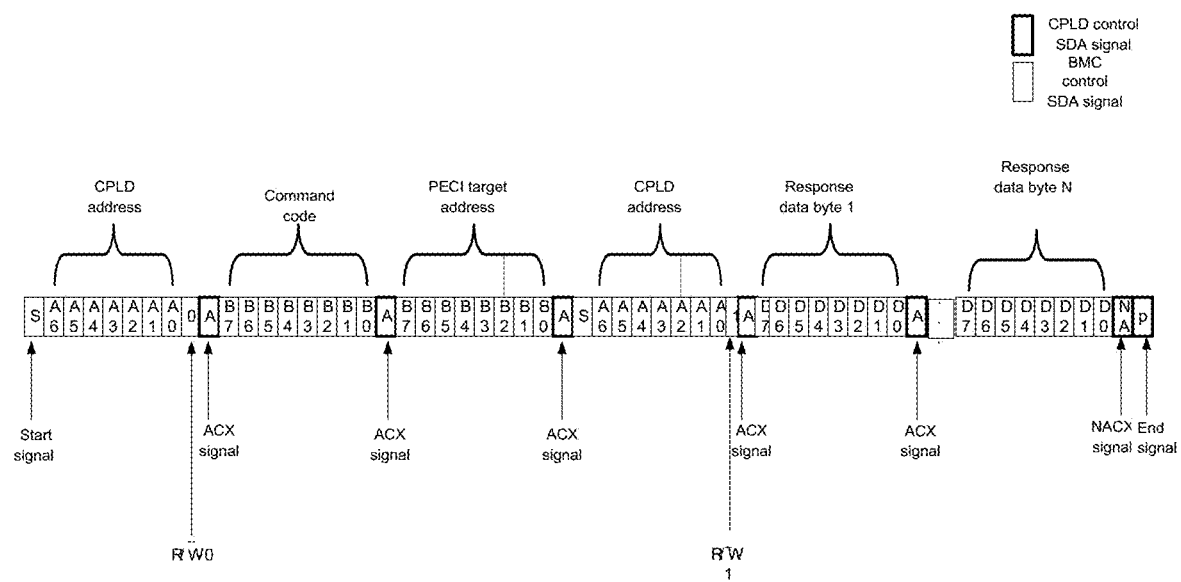
FIG. 6 is a schematic diagram of a format of target response data according to an embodiment of the present application.

Optionally, the response data is data transmitted via the PECI link, and the data format of the response data is the same as the data format of the target request data. The conversion module in the link unit converts the response data into the target response data of the PECI format, and the target response data is data of the I2C format. For example, as shown in FIG. 6, the target response data includes a CPLD address, a command code, a PECI target address, and a response byte (i.e., the operation data of the server).

Optionally, in the present embodiment, it is taken as an example to illustrate a server monitoring system that the CPLD under the hardware partition system implements the system structure of a PECI communication link: the Host side and the BMC are divided into different hardware partitions. The Core partition of each partition management system corresponds to one Host hardware partition, and is responsible for independent management and control of the Host hardware partition. The BMC is interconnected with the CPLD logic unit via the I2C (and GPIO) interfaces, and the hardware partition system on the Host side is interconnected with the CPLD logic unit via the PECI interface, so as to form the interconnection topology of the PECI link of a BMC-CPLD-Host partition system. Based on a PECI data interaction method of exemplary I2C data format and a whole-system PECI data processing flow, the construction of an independent PECI link between the Host and the BMC under the hardware partition system is implemented. No extra hardware investment is required, and it is not necessary to upgrade the architecture of the BMC, thereby saving the hardware cost, and meanwhile improving the resource utilization rate of the CPLD and avoiding the time cost consumed by developing a BMC of a brand-new architecture.

Figure 7:
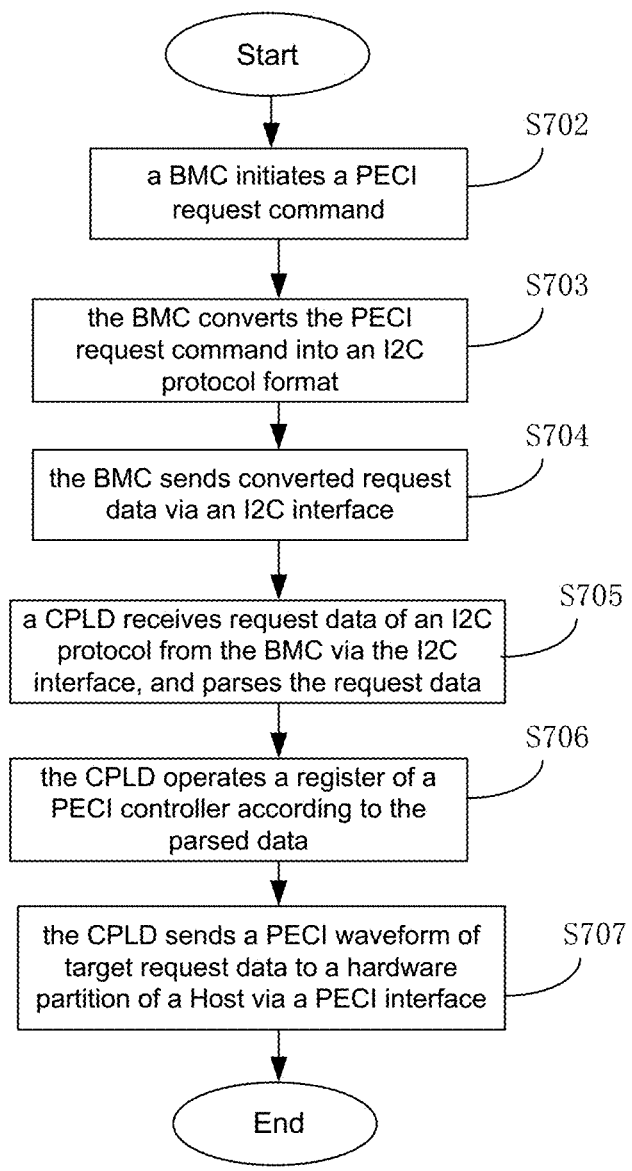
FIG. 7 is a flowchart of sending a command according to an embodiment of the present application.

Optionally, in exemplary embodiment, the link topology among the BMC, the CPLD and the Host is taken as an example for description, which mainly includes a command sending process and a command receiving process. As shown in FIG. 7, the command sending process in the present embodiment includes the following operations:

S702, the BMC initiates a PECI request command;

S703, the BMC converts the PECI request command into an I2C protocol format;

S704, the BMC sends, via an I2C interface, request data that has been subjected to format conversion;

S705, the CPLD receives, via the I2C interface, the request data that is from the BMC and supports an I2C protocol, and parses the request data to parse request content;

S706, the CPLD operates the register of the PECI controller according to the parsed data, and performs format conversion on the request data to convert same into target request data of the PECI format; and S707, the CPLD sends a PECI waveform of the target request data to a hardware partition of the Host via the PECI interface.

Figure 8:
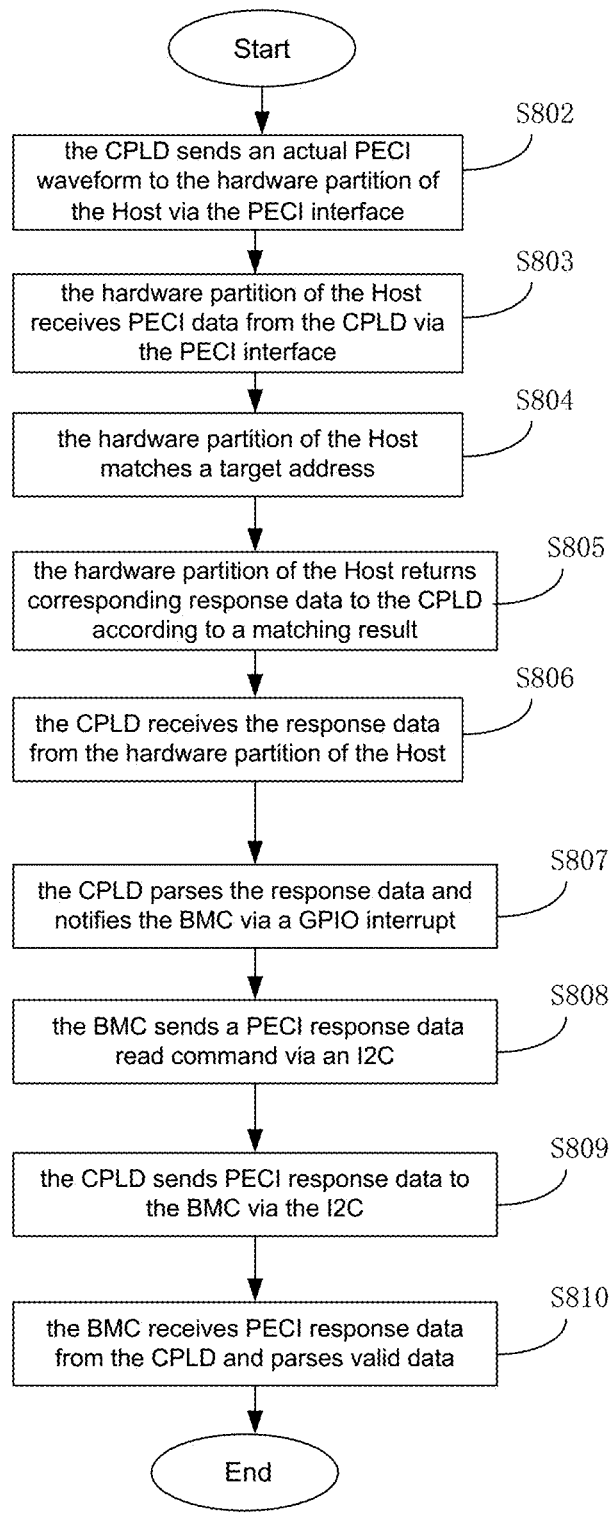
FIG. 8 is a flowchart of receiving a command according to an embodiment of the present application.

Optionally, as shown in FIG. 8, the command receiving process in the present embodiment includes the following operations:

S802, the CPLD sends the PECI waveform of the target request data to the hardware partition of the Host via the PECI interface;

S803, the hardware partition of the Host receives PECI data (i.e., the waveform of the target request data) from the CPLD via the PECI interface;

S804, the Host partition checks a target address field, and when the target address matches the address of the Host partition itself, the Host partition responds to the request data;

S805, the Host partition sends response data to the PECI interface of the CPLD logic unit via the PECI interface of the Host side;

S806, the CPLD logic unit receives the response data from a Host system partition via the PECI interface;

S807, the CPLD parses the response data, and the PECI controller caches the response data in the register;

S808, the BMC sends a PECI response data read command (i.e., a read command) to the CPLD via the I2C interface;

S809, the CPLD sends target response data to the BMC via the I2C interface; and

S810, the BMC receives the target response data from the CPLD and parses out valid data (e.g., the operation data of the server).

In conclusion, in the present embodiment, the construction of the independent PECI link from the partition management system to the Host side in each hardware partition system may be implemented via the PECI link, and the purpose of independent monitoring of a Host multi-hardware-partition system by a single partition management system is achieved.

By means of the descriptions of the above implementations, those skilled in the art may clearly understand that, the method according to the above embodiments may be implemented by software plus a necessary general-purpose hardware platform, and of course may also be implemented by hardware, but the former is a better implementation in many cases. Based on such an understanding, the technical solutions of the present application essentially or the part contributing to the prior art may be embodied in the form of a software product, and the computer software product is stored in a storage medium (e.g., an ROM/RAM, a magnetic disk and an optical disk), and includes several instructions for enabling a terminal device (which may be a mobile phone, a computer, a server, or a network device, and the like) to execute the method in various embodiments of the present application.

In the present embodiment, a baseboard management controller is provided, including: a plurality of partition management systems, wherein a target partition management system among the plurality of partition management systems is connected with at least one target link unit on a complex programmable logic device, the target partition management system is any partition management system among the plurality of partition management systems, and the target link unit is any link management unit among a plurality of link units divided on the complex programmable logic device; and the target link unit is connected with a target hardware partition among a plurality of hardware partitions divided on a server host system, the target hardware partition is any hardware partition among the plurality of hardware partitions, and the target partition management system is configured to monitor the operation of the target hardware partition via the target link unit.

By means of the above baseboard management controller, since the plurality of partition management systems are divided on the baseboard management controller, each target partition management system corresponds to one target link unit divided in the complex programmable logic device, and the target link unit is connected with the target hardware partition among the plurality of hardware partitions divided in a server, the target partition management system may independently manage the target hardware partition via the target link unit. Thus, an interconnection topology of a PECI link is formed, the purpose of constructing an independent PECI link between the partition management system and the server is achieved, and the efficiency of acquiring the operation data of the server by the BMC is improved. Therefore, the problem of low operation monitoring efficiency of the server in the related art may be solved, and the effect of improving the operation monitoring efficiency of the server may be achieved.

Optionally, in the present embodiment, the baseboard management controller may be, but is not limited to, a dedicated controller, which provides intelligent management for a mainboard and is configured to monitor and manage the server based on an IPMI technical design specification, for example, a BMC. The BMC may have an independent operator, a controller, a memory and an input/output device, and may also have an independent software system, which includes a basic boot system, an operating system, and various application programs running on a BMC system. On the mainboard, the BMC may be an independently inserted module and may also be designed as a component integrated on the mainboard, and the BMC is often designed on the mainboard of the server or a computer.

In an exemplary embodiment, the target partition management system includes a target operating system and a target hardware interface, wherein the target hardware interface is configured to connect the target partition management system and the target link unit, and is configured to read operation data of the target hardware partition from the target link unit; and the target operating system is configured to monitor the operation of the target hardware partition by using the operation data.

In an exemplary embodiment, the target partition management system includes an interrupt interface, wherein the interrupt interface is configured to transmit an interrupt signal sent by the target link unit to the target partition management system, and the interrupt signal is used for indicating that the operation data of the target hardware partition has been sent to the target link unit.

In the present embodiment, a complex programmable logic device is provided, including: a plurality of link units, wherein at least one target link unit among the plurality of link units is connected with a target hardware partition among a plurality of hardware partitions divided on a server host system, the target link unit is any link unit among the plurality of link units, and the target hardware partition is any hardware partition among the plurality of hardware partitions; and the target link unit is further connected with a target partition management system among a plurality of partition management systems divided on a baseboard management controller, the target partition management system is any partition management system among the plurality of partition management systems, and the target partition management system is configured to monitor the operation of the target hardware partition via the target link unit.

By means of the above complex programmable logic device, since each target partition management system corresponds to one target link unit divided in the complex programmable logic device, and the target link unit is connected with the target hardware partition among the plurality of hardware partitions divided in a server, the target partition management system may independently manage the target hardware partition via the target link unit. Thus, an interconnection topology of a PECI link is formed, the purpose of constructing an independent PECI link between the partition management system and the server is achieved, and the efficiency of acquiring the operation data of the server by the BMC is improved. Therefore, the problem of low operation monitoring efficiency of the server in the related art may be solved, and the effect of improving the operation monitoring efficiency of the server may be achieved.

Optionally, in the present embodiment, the complex programmable logic device includes, but is not limited to, a device having a link function, and has a data conversion function, for example, a CPLD. The CPLD may have an independent operator, a controller, a memory and an input/output device, and may also have an independent software system, which includes a basic boot system, an operating system, and various application programs running on a BMC system. On a mainboard, the CPLD may be an independently inserted module and may also be designed as a component integrated on the mainboard, and the CPLD is often designed on the mainboard of a server or a computer. A CPLD logic unit and a field programmable gate array (Field Programmable Gate Array (FPGA)) logic unit are inherent devices in a server system, therefore hardware resources in the server system may be fully utilized without additionally adding a hardware structure. It should be noted that a hardware device may also be added according to actual needs to meet the conversion function of a PECI link.

In an exemplary embodiment, the target link unit is connected with the target partition management system via a target hardware interface in the target partition management system, and transmits operation data of the target hardware partition to the target partition management system via the target hardware interface.

In an exemplary embodiment, the target link unit further includes a target controller, wherein the target controller is configured to convert data transmitted between the target hardware partition and the target partition management system, the target controller is a controller supporting a PECI transport protocol, and the target controller is connected with the target hardware partition via a target control interface.

In the present embodiment, a server host system is provided, including: a plurality of hardware partitions, wherein a target hardware partition among the plurality of hardware partitions is connected with a target link unit, and the target link unit is any link unit among a plurality of link units divided on a complex programmable logic device; and the target link unit is connected with a target partition management system, the target partition management system is any partition management system among a plurality of partition management systems divided on a baseboard management controller, and the target partition management system is configured to monitor the operation of the target hardware partition via the target link unit.

By means of the above server host system, since the server host system includes the plurality of hardware partitions, and each hardware partition corresponds to one target partition management system on the baseboard management controller and corresponds to one target link unit divided in the complex programmable logic device, the target partition management system may independently manage the target hardware partition via the target link unit. Thus, an interconnection topology of a PECI link is formed, the purpose of constructing an independent PECI link between the partition management system and a server is achieved, and the efficiency of acquiring the operation data of the server by the BMC is improved. Therefore, the problem of low operation monitoring efficiency of the server in the related art may be solved, and the effect of improving the operation monitoring efficiency of the server may be achieved.

Optionally, in the present embodiment, the server host system may be, but is not limited to, an operating system, which is provided with a plurality of CPUs and is installed on a computer host, and the operating system is generally Windows, Mac, OS and other systems, which manage hardware and software resources of the computer, and provide services and interfaces for use by users or application programs.

Optionally, in the present embodiment, hardware resources of the server host system may be partitioned by taking, but not limited to, a CPU as a partition unit, to obtain a plurality of hardware partitions. Each hardware partition among the plurality of hardware partitions respectively corresponds to one independent operating system, that is, each hardware partition includes hardware resources, such as computing, storage, network and IO, required for system operation of itself.

Optionally, in the present embodiment, at a software level, each hardware partition may respectively operate different operating systems or different versions of the same operating system, and is configured to manage respective independent operation of the corresponding operating system of each hardware partition.

In the present embodiment, a server is provided, including: a baseboard management controller, a complex programmable logic device, and a server host system.

Figure 9:
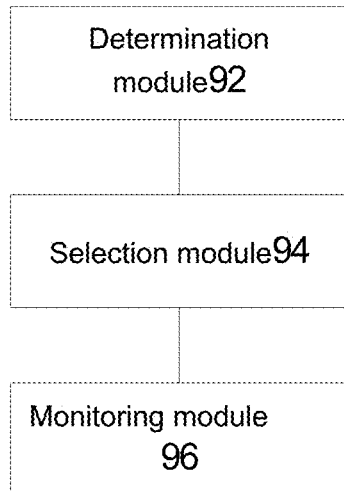
FIG. 9 is a structural block diagram of an apparatus for monitoring a hardware partition of a server host system according to an embodiment of the present application.

In the present embodiment, an apparatus for monitoring a hardware partition of a server host system is provided, as shown in FIG. 9, it is a structural block diagram of an apparatus for monitoring a hardware partition of a server host system in the present embodiment, and the apparatus includes:

a determination module 92, configured to determine a target partition management system on a baseboard management controller, wherein the target partition management system is any partition management system among a plurality of partition management systems divided on the baseboard management controller;

a selection module 94, configured to select, for the target partition management system, at least one target link unit among a plurality of link units divided on a complex programmable logic device, wherein the target link unit is configured to connect the target partition management system and a target hardware partition among a plurality of hardware partitions divided on the server host system; and a monitoring module 96, configured to monitor the operation of the target hardware partition via the target partition management system and the target link unit.

In an exemplary embodiment, the selection module 94 includes: a first acquisition unit, configured to acquire the plurality of link units on the complex programmable logic device; a first allocation unit, configured to allocate a target operating system on the baseboard management controller to each target link unit among the plurality of link units, wherein the target link unit at least meets a link requirement of the target operating system; a second allocation unit, configured to allocate a hardware interface on the baseboard management controller to the target link unit to obtain a target hardware interface, wherein the target hardware interface at least meets a hardware connection requirement of the target operating system; and a first establishment unit, configured to establish a correspondence between the target partition management system and the target link unit having a correspondence with the target operating system and the target hardware interface, to obtain a link unit and a partition management system, which have a correspondence.

In an exemplary embodiment, the apparatus further includes: a first acquisition module, configured to: before establishing the correspondence between the target partition management system and the target link unit having the correspondence with the target operating system and the target hardware interface, acquire the plurality of partition management systems on the baseboard management controller; a first allocation module, configured to allocate an operating system on the baseboard management controller to each target partition management system among the plurality of partition management systems, to obtain the target operating system; a second allocation module, configured to allocate a hardware interface on the baseboard management controller to each target partition management system, to obtain the target hardware interface; and a first establishment module, configured to establish a correspondence of the target partition management system with the target operating system and the target hardware interface, to obtain a partition management system, an operating system link and a hardware interface, which have a correspondence.

In an exemplary embodiment, the apparatus further includes: a second acquisition module, configured to: after establishing the correspondence between the target partition management system and the target link unit having the correspondence with the target operating system and the target hardware interface, acquire the plurality of hardware partitions of the host system; a third allocation module, configured to allocate a controller on the complex programmable logic device to each target hardware partition among the plurality of hardware partitions, to obtain a target controller, wherein the target controller at least meets a control operation requirement for the target hardware partition; a fourth allocation module, configured to allocate a control interface on the complex programmable logic device to the target hardware partition, to obtain a target control interface, wherein the target control interface at least meets a connection requirement of the target hardware partition; and a second establishment module, configured to establish a correspondence of the target hardware partition with the target controller and the target control interface, to obtain a hardware partition and a link unit, which have a correspondence.

In an exemplary embodiment, the monitoring module 96 includes: a first sending unit, configured to send request data to the target link unit via the target partition management system, wherein the request data is configured to request operation data of the target hardware partition; a first conversion unit, configured to convert, via the target link unit, the request data into data supporting a PECI transport protocol, to obtain target request data, and send the target request data to the target hardware partition; and a second acquisition unit, configured to: when the target hardware partition responds to the target request data, acquire response data that is generated by the target hardware partition and includes the operation data; a first receiving unit, configured to receive, via the target link unit, the response data sent by the target hardware partition, and convert the response data into data supporting an I2C transport protocol, to obtain target response data, wherein the response data is data supporting the PECI transport protocol; and a third acquisition unit, configured to acquire the target response data from the target link unit via the target partition management system, extract, from the target response data, the operation data generated by the target hardware partition, and monitor the operation of the target hardware partition by using the operation data.

In an exemplary embodiment, the first sending unit includes: a first generation sub-unit, configured to generate the request data via the target operating system corresponding to the target partition management system; and a first sending sub-unit, configured to send the request data to the target link unit via the target hardware interface corresponding to the target partition management system, wherein the target hardware interface allows the transmission of the request data supporting the I2C transport protocol.

In an exemplary embodiment, the first conversion unit includes: a first conversion sub-unit, configured to convert the request data into the target request data via the target controller corresponding to the target link unit, wherein the target controller is a controller supporting the PECI transport protocol, the target controller is connected with a register in the target link unit, and the register is configured to store the target request data; and a second sending sub-unit, configured to send the target request data from the register to the target hardware partition via the target control interface corresponding to the target link unit.

In an exemplary embodiment, the first receiving unit includes: a second conversion sub-unit, configured to convert the response data into the target response data via the target controller corresponding to the target link unit, wherein the target controller is a controller supporting the PECI transport protocol, the target controller is connected with the register in the target link unit, and the register is configured to store the target response data.

In an exemplary embodiment, the apparatus further includes: a first sending module, configured to: before acquiring the target response data from the target link unit via the target partition management system, send an interrupt signal to the target partition management system via the target link unit, wherein the interrupt signal is used for indicating that the response data has been sent to the target link unit.

In an exemplary embodiment, the third acquisition unit includes: a first generation unit, configured to generate a read instruction via the target operating system corresponding to the target partition management system, and send the read instruction to the target link unit via the target hardware interface corresponding to the target partition management system, wherein the target hardware interface allows the transmission of the request data supporting the I2C transport protocol; a first reading unit, configured to, read, via the target hardware interface, the target response data from the register corresponding to the target link unit; and a fourth reading unit, configured to parse the target response data via the target operating system to acquire the operation data, and monitor the operation of the target hardware partition according to the operation data.

In an exemplary embodiment, the request data includes at least one of the following: an address of the target hardware partition, detection information of the target hardware partition, a data format of the request data, and information of parameters for requesting to acquire the operation data of the target hardware partition, wherein the detection information is used for requesting to detect whether a link supporting the transmission of PECI data is provided in the target hardware partition.

Figure 10:
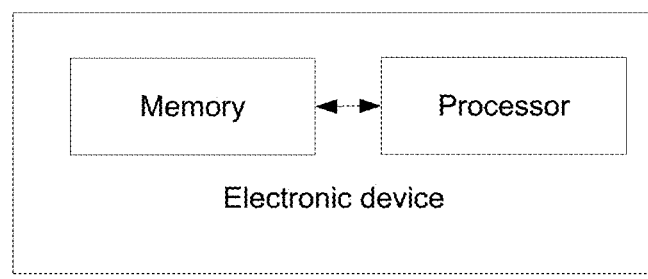
FIG. 10 is a schematic diagram of exemplary electronic device according to an embodiment of the present application.

An embodiment of the present application further provides an electronic device, wherein FIG. 10 is a schematic diagram of exemplary electronic device according to an embodiment of the present application, as shown in FIG. 10, the electronic device includes one or more processors; a memory, configured to store one or more programs, wherein when the one or more programs are executed by the one or more processors, the one or more processors are configured to operate the programs, and the programs are configured to execute, when running, the method for monitoring the hardware partition of the server host system mentioned above.

In an exemplary embodiment, the electronic device may further include a transmission device and an input/output device, wherein the transmission device is connected with the processor, and the input/output device is connected with the processor.

The present application further provides a computer non-volatile readable storage medium, wherein the computer non-volatile readable storage medium stores a computer program, which, when executed by a processor, executes a method for monitoring a hardware partition of a server host system.

Figure 11:
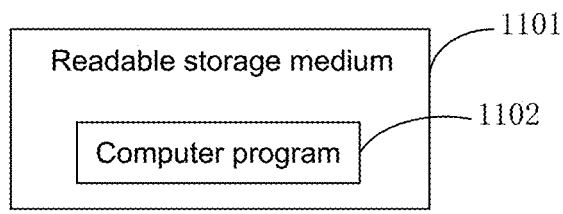
FIG. 11 is a schematic diagram of an embodiment of a computer non-volatile readable storage medium of a method for monitoring a hardware partition of a server host system provided in the present application.

As shown in FIG. 11, it is a schematic diagram of an embodiment of a computer non-volatile readable storage medium of the method for monitoring the hardware partition of the server host system provided in the present application. Taking the computer non-volatile readable storage medium shown in FIG. 11 as an example, the computer non-volatile readable storage medium 1101 stores a computer program 1102, which, when executed by a processor, executes the above method.

An embodiment of the present application further provides a computer program product, including a computer program, wherein the computer program, when executed by a processor, implements the operations in any of the above method embodiments.

An embodiment of the present application further provides another computer program product, including a computer non-volatile readable storage medium, wherein the computer non-volatile readable storage medium stores a computer program, and the computer program, when executed by a processor, implements the operations in any of the above method embodiments.

An embodiment of the present application further provides a computer program, including a computer instruction, wherein the computer instruction is stored in a computer-readable storage medium; and a processor of a computer device reads the computer instruction from the computer-readable storage medium, and the processor executes the computer instruction, so that the computer device executes the operations in any of the above method embodiments.

Finally, it should be noted that, those ordinary skilled in the art may understand that all or some processes in the method of the above embodiments may be implemented by instructing related hardware by a computer program, and a program of a method for monitoring a hardware partition of a server host system may be stored in a computer non-volatile readable storage medium, and when the program is executed, the processes of the embodiments of the above method may be included, wherein a non-volatile readable storage medium of the program may be a magnetic disk, an optical disk, a read-only memory (Read-Only Memory (ROM)), a random access memory (Random Access Memory (RAM)), or the like. The embodiment of the above computer program may achieve the same or similar effects as any of foregoing method embodiments corresponding thereto.

The above descriptions are exemplary embodiments disclosed in the present application, however, it should be noted that various changes and modifications may be made without departing from the scope disclosed in the embodiments of the present application and defined by the claims. The functions, operations and/or actions of the method claims according to the disclosed embodiments described herein need not be executed in any particular order. In addition, although elements disclosed in the embodiments of the present application may be described or claimed in an individual form, unless explicitly limited to be singular, it may be understood that there are a plurality of elements.

It should be understood that as used herein, unless the context clearly supports exceptional cases, a singular form "a" is also intended to include a plural form. It should also be understood that as used herein, "and/or" refers to including any and all possible combinations of one or more of items list in association.

The serial numbers of the embodiments disclosed in the above embodiments of the present application are only for description, and do not represent the advantages or disadvantages of the embodiments.

Those ordinary skilled in the art may understand that all or some operations for implementing the above embodiments may be completed by hardware and may also be completed by a program instructing related hardware, the program may be stored in a computer non-volatile readable storage medium, and the non-volatile readable storage medium mentioned above may be a read-only memory, a magnetic disk, an optical disk, etc.

It should be understood by those ordinary skilled in the art to which the present application belongs that, the discussion of any of the above embodiments is merely exemplary and is not intended to imply that the scope (including the claims) disclosed in the embodiments of the present application is limited to these examples; under the ideas of the embodiments of the present application, the technical features in the above embodiments or different embodiments may also be combined, and there are many other changes in different aspects of the embodiments of the present application mentioned above, which are not provided in detail for the sake of brevity. Therefore, any omissions, modifications, equivalent replacements, improvements, and the like, made within the spirit and principles of the embodiments of the present application, shall all fall within the protection scope of the embodiments of the present application.

What is claimed is:

1. A method for monitoring a hardware partition of a server host system, comprising:
    determining a target partition management system on a baseboard management controller, wherein the target partition management system is any partition management system among a plurality of partition management systems divided on the baseboard management controller;
    selecting, for the target partition management system, at least one target link unit among a plurality of link units divided on a complex programmable logic device, wherein the target link unit is configured to connect the target partition management system and a target hardware partition among a plurality of hardware partitions divided on the server host system; and
    monitoring operation of the target hardware partition via the target partition management system and the target link unit;
    wherein monitoring the operation of the target hardware partition via the target partition management system and the target link unit comprises:
    sending request data to the target link unit via the target partition management system, wherein the request data is configured to request operation data of the target hardware partition;
    converting, via the target link unit, the request data into data supporting a Process Execution Control Interface (PECI) transport protocol, to obtain target request data, and sending the target request data to the target hardware partition;
    when the target hardware partition responds to the target request data, acquiring response data that is generated by the target hardware partition and comprises the operation data;
    receiving, via the target link unit, the response data sent by the target hardware partition, and converting the response data into data supporting an Inter-Integrated Circuit (I2C) transport protocol, to obtain target response data, wherein the response data is data supporting the PECI transport protocol; and
    acquiring the target response data from the target link unit via the target partition management system, extracting, from the target response data, the operation data generated by the target hardware partition, and monitoring the operation of the target hardware partition by using the operation data.

2. The method according to claim 1, wherein selecting, for the target partition management system, the target link unit among the plurality of link units divided on the complex programmable logic device comprises:
    acquiring the plurality of link units on the complex programmable logic device;
    allocating a target operating system on the baseboard management controller to each target link unit among the plurality of link units, wherein the target link unit at least meets a link requirement of the target operating system;
    allocating a hardware interface on the baseboard management controller to the target link unit to obtain a target hardware interface, wherein the target hardware interface at least meets a hardware connection requirement of the target operating system; and
    establishing a correspondence between the target partition management system and the target link unit having a correspondence with the target operating system and the target hardware interface, to obtain a link unit and a partition management system, which have a correspondence.

3. The method according to claim 2, wherein before establishing the correspondence between the target partition management system and the target link unit having the correspondence with the target operating system and the target hardware interface, the method further comprises:
    acquiring the plurality of partition management systems on the baseboard management controller;
    allocating an operating system on the baseboard management controller to each target partition management system among the plurality of partition management systems, to obtain the target operating system;
    allocating a hardware interface on the baseboard management controller to each target partition management system, to obtain the target hardware interface; and
    establishing a correspondence of the target partition management system with the target operating system and the target hardware interface, to obtain a partition management system, an operating system link and a hardware interface, which have a correspondence, wherein the operating system link is a link for connecting the target partition management system and the target operating system.

4. The method according to claim 3, wherein the target link unit further comprises a target controller, wherein,
    one partition management system corresponds to one operating system, and the operating system is configured to process data to be received or sent in the partition management system.

5. The method according to claim 2, wherein after establishing the correspondence between the target partition management system and the target link unit having the correspondence with the target operating system and the target hardware interface, the method further comprises:
  acquiring the plurality of hardware partitions of the host system;
  allocating a controller on the complex programmable logic device to each target hardware partition among the plurality of hardware partitions, to obtain a target controller, wherein the target controller at least meets a control operation requirement for the target hardware partition;
  allocating a control interface on the complex programmable logic device to the target hardware partition, to obtain a target control interface, wherein the target control interface at least meets a connection requirement of the target hardware partition; and
  establishing a correspondence of the target hardware partition with the target controller and the target control interface, to obtain a hardware partition and a link unit, which have a correspondence.

6. The method according to claim 2, wherein the target link unit further comprises a target controller, wherein,
  the target operating system refers to any operating system that runs on the baseboard management controller.

7. The method according to claim 2, wherein the target link unit further comprises a target controller, wherein,
  one or more target hardware interfaces are provided in the partition management system, and the target hardware interface is an interface having a data transmission capability, which is correspondingly connected to a link management unit.

8. The method according to claim 1, wherein sending the request data to the target link unit via the target partition management system comprises:
  generating the request data via a target operating system corresponding to the target partition management system; and
  sending the request data to the target link unit via a target hardware interface corresponding to the target partition management system, wherein the target hardware interface allows the transmission of the request data supporting the I2C transport protocol.

9. The method according to claim 1, wherein converting, via the target link unit, the request data into the data supporting the PECI transport protocol, to obtain the target request data, and sending the target request data to the target hardware partition comprises:
  converting the request data into the target request data via a target controller corresponding to the target link unit, wherein the target controller is a controller supporting the PECI transport protocol, the target controller is connected with a register in the target link unit, and the register is configured to store the target request data; and
  sending the target request data from the register to the target hardware partition via a target control interface corresponding to the target link unit.

10. The method according to claim 1, wherein receiving, via the target link unit, the response data sent by the target hardware partition, and converting the response data into the data supporting the I2C transport protocol, to obtain the target response data comprises:
  converting the response data into the target response data via a target controller corresponding to the target link unit, wherein the target controller is a controller supporting the PECI transport protocol, a target controller is connected with a register in the target link unit, and the register is configured to store the target response data.

11. The method according to claim 1, wherein before acquiring the target response data from the target link unit via the target partition management system, the method further comprises:
  sending an interrupt signal to the target partition management system via the target link unit, wherein the interrupt signal is used for indicating that the response data has been sent to the target link unit.

12. The method according to claim 1, wherein acquiring the target response data from the target link unit via the target partition management system, extracting, from the target response data, the operation data generated by the target hardware partition, and monitoring the operation of the target hardware partition by using the operation data comprises:
  generating a read instruction via a target operating system corresponding to the target partition management system, and sending the read instruction to the target link unit via the target hardware interface corresponding to the target partition management system, wherein the target hardware interface allows the transmission of the request data supporting the I2C transport protocol;
  reading, via the target hardware interface, the target response data from the register corresponding to the target link unit; and
  parsing the target response data via the target operating system to acquire the operation data, and monitoring the operation of the target hardware partition according to the operation data.

13. The method according to claim 1, wherein the request data comprises at least one of the following: an address of the target hardware partition, detection information of the target hardware partition, a data format of the request data, and information of parameters for requesting to acquire the operation data of the target hardware partition, wherein the detection information is used for requesting to detect whether a link supporting the transmission of PECI data is provided in the target hardware partition.

14. A baseboard management controller, comprising: a plurality of partition management systems, wherein,
  a target partition management system among the plurality of partition management systems is connected with at least one target link unit on a complex programmable logic device, the target partition management system is any partition management system among the plurality of partition management systems, and the target link unit is any link management unit among a plurality of link units divided on the complex programmable logic device; and
  the target link unit is connected with a target hardware partition among a plurality of hardware partitions divided on a server host system, the target hardware partition is any hardware partition among the plurality of hardware partitions, and the target partition management system is configured to monitor the operation of the target hardware partition via the target link unit;
  wherein monitoring the operation of the target hardware partition via the target partition management system and the target link unit comprises:
  sending request data to the target link unit via the target partition management system, wherein the request data is configured to request operation data of the target hardware partition;

converting, via the target link unit, the request data into data supporting a Process Execution Control Interface (PECI) transport protocol, to obtain target request data, and sending the target request data to the target hardware partition;

when the target hardware partition responds to the target request data, acquiring response data that is generated by the target hardware partition and comprises the operation data;

receiving, via the target link unit, the response data sent by the target hardware partition, and converting the response data into data supporting an Inter-Integrated Circuit (I2C) transport protocol, to obtain target response data, wherein the response data is data supporting the PECI transport protocol; and acquiring the target response data from the target link unit via the target partition management system, extracting, from the target response data, the operation data generated by the target hardware partition, and monitoring the operation of the target hardware partition by using the operation data.

15. The baseboard management controller according to claim 14, wherein the target partition management system comprises a target operating system and a target hardware interface, wherein, the target hardware interface is configured to connect the target partition management system and the target link unit, and is configured to read operation data of the target hardware partition from the target link unit; and the target operating system is configured to monitor the operation of the target hardware partition by using the operation data.

16. The baseboard management controller according to claim 14, wherein the target partition management system comprises an interrupt interface, wherein, the interrupt interface is configured to transmit an interrupt signal sent by the target link unit to the target partition management system, and the interrupt signal is used for indicating that the operation data of the target hardware partition has been sent to the target link unit.

17. A complex programmable logic device, comprising: a plurality of link units, wherein, at least one target link unit among the plurality of link units is connected with a target hardware partition among a plurality of hardware partitions divided on a server host system, the target link unit is any link unit among the plurality of link units, and the target hardware partition is any hardware partition among the plurality of hardware partitions; and the target link unit is further connected with a target partition management system among a plurality of partition management systems divided on a baseboard management controller, the target partition management system is any partition management system among the plurality of partition management systems, and the target partition management system is configured to monitor the operation of the target hardware partition via the target link unit;

wherein monitoring the operation of the target hardware partition via the target partition management system and the target link unit comprises:

sending request data to the target link unit via the target partition management system, wherein the request data is configured to request operation data of the target hardware partition;

converting, via the target link unit, the request data into data supporting a Process Execution Control Interface (PECI) transport protocol, to obtain target request data, and sending the target request data to the target hardware partition;

when the target hardware partition responds to the target request data, acquiring response data that is generated by the target hardware partition and comprises the operation data;

receiving, via the target link unit, the response data sent by the target hardware partition, and converting the response data into data supporting an Inter-Integrated Circuit (I2C) transport protocol, to obtain target response data, wherein the response data is data supporting the PECI transport protocol; and acquiring the target response data from the target link unit via the target partition management system, extracting, from the target response data, the operation data generated by the target hardware partition, and monitoring the operation of the target hardware partition by using the operation data.

18. The complex programmable logic device according to claim 17, wherein the target link unit is connected with the target partition management system via a target hardware interface in the target partition management system, and transmits operation data of the target hardware partition to the target partition management system via the target hardware interface.

19. The complex programmable logic device according to claim 17, wherein the target link unit further comprises a target controller, wherein, the target controller is configured to convert data transmitted between the target hardware partition and the target partition management system, the target controller is a controller supporting a PECI transport protocol, and the target controller is connected with the target hardware partition via a target control interface.

* * * * *